(12) United States Patent
Kobayashi et al.

(10) Patent No.: US 8,777,258 B2
(45) Date of Patent: Jul. 15, 2014

(54) GAS GENERATOR FOR RESTRAINING APPARATUS

(75) Inventors: Tomoharu Kobayashi, Hyogo (JP);
Masayuki Yamazaki, Hyogo (JP);
Shinichiro Ukita, Hyogo (JP)

(73) Assignee: Daicel Corporation, Osaka (JP)

( * ) Notice: Subject to any disclaimer, the term of this patent is extended or adjusted under 35 U.S.C. 154(b) by 269 days.

(21) Appl. No.: 13/433,374

(22) Filed: Mar. 29, 2012

(65) Prior Publication Data

US 2012/0247361 A1 Oct. 4, 2012

Related U.S. Application Data

(60) Provisional application No. 61/469,492, filed on Mar. 30, 2011.

(30) Foreign Application Priority Data

Mar. 30, 2011 (JP) .................................. 2011-73905

(51) Int. Cl.
*B60R 21/264* (2006.01)
*B60R 21/26* (2011.01)
*F42B 3/04* (2006.01)

(52) U.S. Cl.
CPC ............. *B60R 21/2644* (2013.01); *B60R 21/26* (2013.01); *F42B 3/04* (2013.01); *B60R 21/264* (2013.01)
USPC ............ 280/736; 280/741; 102/334; 102/530

(58) Field of Classification Search
CPC .. B60R 21/2644; B60R 21/264; B60R 21/26; B60R 2021/2648; B60R 2021/2642; B60R 2021/264; F42B 3/04
USPC ............................ 280/736, 741; 102/334, 530
See application file for complete search history.

(56) References Cited

U.S. PATENT DOCUMENTS

| 4,892,038 A | * | 1/1990 | Lubbers ......................... 102/439 |
| 5,217,697 A | * | 6/1993 | Kanazawa et al. ............. 422/165 |
| 5,482,316 A | * | 1/1996 | Lang et al. ..................... 280/741 |

(Continued)

FOREIGN PATENT DOCUMENTS

| JP | 2006-76849 A | 3/2006 |
| WO | WO 2010/082680 A1 | 7/2010 |

OTHER PUBLICATIONS

International Search Report and Written Opinion issued in International Patent Application No. PCT/JP2012/058769 on Jun. 14, 2012.

*Primary Examiner* — Paul N Dickson
*Assistant Examiner* — Barry Gooden, Jr.
(74) *Attorney, Agent, or Firm* — Birch, Stewart, Kolasch & Birch, LLP

(57) ABSTRACT

The invention provides a gas generator for a restraining apparatus, including:
- a housing an ignition device, and a gas generating agent accommodated in the housing, and
- a cup-shaped container having a flame-transferring hole in a circumferential wall and being disposed on a tubular igniter-fixing portion of the housing to form an ignition device chamber accommodating the ignition device,
- the cup-shaped container having a plurality of protruding portions protruding inward in the radial direction from the circumferential wall portion,
- the tubular igniter-fixing portion having a recess on an outer surface,
- at least a distal end portion of the protruding portion engaging with an inner wall surface of the recess to block an axial movement of the cup-shaped container.

10 Claims, 10 Drawing Sheets

(56) References Cited

U.S. PATENT DOCUMENTS

| | | | |
|---|---|---|---|
| 5,588,676 A * | 12/1996 | Clark et al. | 280/741 |
| 5,602,359 A * | 2/1997 | Hambro et al. | 102/202.5 |
| 5,639,986 A * | 6/1997 | Evans | 102/531 |
| 5,924,728 A * | 7/1999 | Evans et al. | 280/741 |
| 6,068,294 A * | 5/2000 | Jordan | 280/741 |
| 6,189,927 B1 * | 2/2001 | Mossi et al. | 280/741 |
| 6,341,562 B1 * | 1/2002 | Brisighella | 102/202.14 |
| 6,959,548 B2 * | 11/2005 | Borg et al. | 60/632 |
| 7,481,447 B2 * | 1/2009 | Stevens | 280/728.2 |
| 7,597,353 B2 * | 10/2009 | Smith et al. | 280/736 |
| 7,614,875 B2 * | 11/2009 | Katsuda et al. | 431/253 |
| 8,434,413 B2 * | 5/2013 | Mitsunabe et al. | 102/530 |
| 8,496,266 B2 * | 7/2013 | Gmitter et al. | 280/741 |
| 8,590,930 B2 * | 11/2013 | Mitsunabe | 280/741 |
| 2003/0151241 A1 | 8/2003 | Matsuda et al. | |
| 2004/0250542 A1 * | 12/2004 | Nishina | 60/632 |
| 2006/0033317 A1 * | 2/2006 | Stevens | 280/741 |
| 2006/0082113 A1 * | 4/2006 | Smith et al. | 280/741 |
| 2006/0208474 A1 * | 9/2006 | Kubo et al. | 280/806 |
| 2006/0254454 A1 * | 11/2006 | Bierwirth | 102/530 |
| 2007/0001437 A1 * | 1/2007 | Wall et al. | 280/736 |
| 2007/0273132 A1 * | 11/2007 | Smith et al. | 280/736 |
| 2008/0022880 A1 * | 1/2008 | Bierwirth et al. | 102/530 |
| 2008/0257195 A1 | 10/2008 | Nakayasu et al. | |
| 2009/0126592 A1 * | 5/2009 | Mukunoki et al. | 102/202.7 |
| 2012/0024186 A1 * | 2/2012 | Mitsunabe et al. | 102/530 |
| 2013/0068123 A1 * | 3/2013 | Lefevre et al. | 102/530 |
| 2013/0199398 A1 * | 8/2013 | Mitsunabe | 102/530 |
| 2013/0276663 A1 * | 10/2013 | Ohsugi et al. | 102/530 |

* cited by examiner (a)                              (b)

US 8,777,258 B2

GAS GENERATOR FOR RESTRAINING APPARATUS

This nonprovisional application claims priority under 35 U.S.C. §119(a) to Patent Application No. 2011-73905 filed in Japan on 30 Mar. 2011, and 35 U.S.C. §119(e) to U.S. Provisional Application No. 61/469,492 filed on 30 Mar. 2011, both of which are incorporated by reference.

BACKGROUND OF INVENTION

1. Field of Invention

The present invention relates to a gas generator for a restraining apparatus for use in a restraining apparatus such as an airbag device.

Among gas generators for an airbag apparatus, a tubular container or a cup-shaped container is generally used when forming an ignition device chamber that accommodates an igniter and a transfer charge or when dividing a combustion chamber in two chambers in the a gas generator using a gas generating agent as a gas generation source.

The tubular container or cup-shaped container is fixed inside the housing of the gas generator.

2. Description of Related Art

Claim 6 of JP-A No. 2006-076849 mentions a gas generator for a vehicle passenger protecting apparatus, that uses a gas generating agent composition.

In the gas generator shown in FIG. 1 of JP-A No. 2006-076849, a combustion chamber 8 charged with a gas generating agent 4 is provided inside a housing formed by an upper lid 6 and a lower lid 10. An igniter 2 is attached to the center portion of the lower lid 10. The igniter 2 is covered by a bottomed inner tubular body 13 charged with a transfer charge 3.

The bottomed inner tubular body 13 is fixed to the flange portion in the opening side of the inner tubular body 13 by bending inward (that is, crimping) an annular protruding portion (an ignition device holding portion) formed at the lower lid 10 (paragraph [0040]).

SUMMARY OF THE INVENTION

The invention provides a gas generator for a restraining apparatus, including:

a housing having a gas discharge port and formed by a closure shell and a diffuser shell;

an ignition device, which includes an igniter, and a gas generating agent being accommodated in the housing; and a cup-shaped container having a flame-transferring hole in a circumferential wall portion thereof and being disposed on the closure shell inside the housing to form an ignition device chamber, the ignition device chamber accommodating the ignition device, and the igniter being fixed to a tubular igniter-fixing portion provided in a closure shell, the cup-shaped container having a plurality of protruding portions protruding inward in a radial direction from a circumferential wall portion thereof, the tubular igniter-fixing portion having a recess on an outer surface, at least a distal end portion of the protruding portion of the cup-shaped container abutting on an inner wall surface of the recess of the tubular igniter-fixing portion to block an axial movement of the cup-shaped container.

BRIEF DESCRIPTION OF DRAWINGS

The present invention will become more fully understood from the detailed description given hereinbelow and the accompanying drawings which are given by way of illustration only, and thus are not limitative of the present invention and wherein:

FIG. 8 is, in (b), a plan view of the configuration shown in (a) of FIG. 8.

FIG. 9 is, in (b), a plan view of the configuration shown in (a) of FIG. 9.

FIG. 15 is, in (b), a partial cross-sectional view.

DETAILED EXPLANATION OF INVENTION

Figure 1:
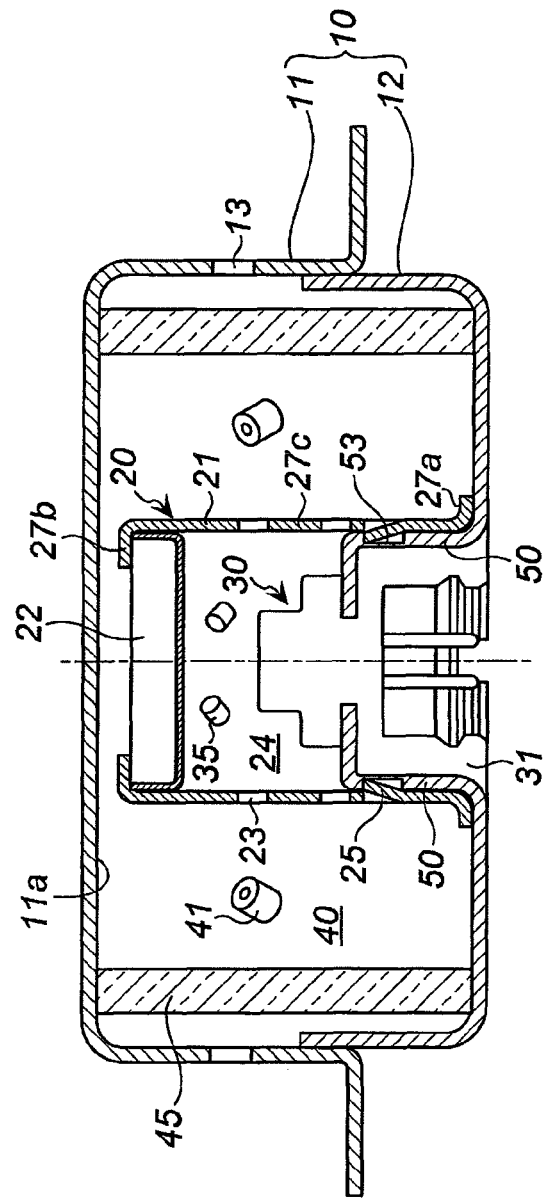
FIG. 1 is an axial sectional view of the gas generator in accordance with the present invention.

In order to form the annular protruding portion (the ignition device holding portion) formed at the lower lid 10 in JP-A No. 2006-076849, it is necessary to perform cutting work on the lower lid around in the circumferential direction and the number of operations is increased, thereby raising the production cost.

Further, when the gas generator is actuated, the pressure generated inside the inner tubular body 13 pushes the inner tubular body upward. Therefore, when the fixing method using the abovementioned crimping structure is employed, the thickness of the crimped portion should be increased in order to withstand the aforementioned pressure. For automobile parts, even 1-g weigh reduction is important, and the fixing method using the crimping structure described in JP-A No. 2006-076849 has room for improvement from the standpoint of weight reduction.

The present invention provides a gas generator for a restraining apparatus that enables cost reduction in machining and processing, facilitates the attachment and fixing of a cup-shaped container forming an ignition device chamber, and makes it possible to reduce weight.

In accordance with the present invention, the cup-shaped container forming the ignition device chamber is attached to the tubular igniter-fixing portion provided in the closure shell, such that the axial movement of the cup-shaped container is prevented.

Further, the cup-shaped container and the tubular igniter-fixing portion are attached such that each of the distal end portions of a plurality of protruding portions protruding radially inward from the circumferential wall portion of the cup-shaped container abuts on the recess of the tubular igniter-fixing portion.

With such a combination of the protruding portion and the recess, when the igniter in the cup-shaped container (in the ignition device chamber) is actuated and a pressure is applied to the cup-shaped container in the axial direction, the distal end portions of the protruding portions are pressed against the inner wall surface of the recess, thereby preventing the cup-shaped container from moving in the axial direction.

In order to produce such a movement preventing action, it is preferred that the inner wall surface of the recess have a corner portion, a surface portion, an edge portion, or a combination thereof that engages with the distal end portions of the protruding portions.

The number of the protruding portion is in plurality, preferably 2 to 10, more preferably 4 to 8, and the protruding portions are preferably equidistantly arranged in the circumferential direction.

The recess may be annularly formed in a continuous manner along the circumferential direction of the igniter-fixing portion, or a plurality of recesses may be formed in positions corresponding to the protruding portions, the number of the recesses being equal to that of the protruding portions.

From the standpoint of weight reduction, it is preferred that the protruding portions of the cup-shaped container be formed integrally with the cup-shaped container, but a configuration in which separate members serving as the protruding portions are fixedly attached by welding or the like to the cup-shaped container is not excluded from the present invention.

The recess of the igniter-fixing portion is formed by press work or cutting work. For example, in the case that about six recesses are formed, they can be formed by pressing. Therefore, the processing operation is simple.

In order to enhance the function of preventing the axial movement of the cup-shaped container, it is preferred that the recess of the igniter-fixing portion have a depth equal to or greater than the thickness of the distal end portion of the protruding portion engaging therewith.

The cup-shaped container forming the ignition device chamber can be not only one obtained by integrally forming the bottom surface (or the ceiling surface) and the circumferential surface, but also one obtained by combining the tubular portion with a lid that closes the opening at one end side thereof.

The flame-transferring hole formed in the circumferential wall portion of the cup-shaped container serves for discharging the flame and high-temperature gas generated by the ignition device and may be closed with a seal tape or the like from the outer or inner side.

The known ignition device is used, and a combination of an electric igniter and a transfer charge is used.

Where the combination of a protruding portion and the recess is used, the processing is facilitated and the weight of parts can be reduced by comparison with those in the case where the crimped structure disclosed in JP-A No. 2006-076849 is used.

Further, since the cup-shaped container is fixed to the igniter-fixing portion stronger than in the crimped structure disclosed in JP-A No. 2006-076849, the cup-shaped container is unlikely to be disconnected from the igniter-fixing portion by the pressure. Therefore, a constant internal volume of the cup-shaped container is maintained, stable burning of the transfer charge charged thereinto is ensured, and interference with other parts is prevented.

In the gas generator in accordance with the present invention, the cup-shaped container and the tubular igniter-fixing portion can be assembled such that the inner circumferential surface of the cup-shaped container is in contact with the outer circumferential surface of the igniter-fixing portion that directly opposes the inner circumferential surface.

In the case of such a contact state, a gap between the cup-shaped container and the tubular igniter-fixing portion does not substantially served as a discharge path for the flame and high-temperature gas.

Further, in the gas generator in accordance with the present invention, the cup-shaped container and the tubular igniter-fixing portion can be assembled such that a gap is provided between the inner circumferential surface of the cup-shaped container and the outer circumferential surface of the igniter-fixing portion that directly opposes the inner circumferential surface.

In the case of such contact state, the gap between the cup-shaped container and the tubular igniter-fixing portion serves as a discharge path for the flame and high-temperature gas. A flame-transferring hole can be also formed in the section of the circumferential wall portion of the cup-shaped container that corresponds to the discharge path. Such a configuration is preferred because the entire gas generating agent located inside the combustion chamber can be ignited more uniformly.

The invention includes preferable embodiments 2 to 10 as follows:

Embodiment 2

The gas generator for a restraining apparatus according to the invention can include the following features.

A protruding portion of the cup-shaped container is formed by bending inward a circumferential wall portion of the cup-shaped portion, corresponding to a quadrangle formed by three cutting lines and one remaining side, the three cutting lines penetrate through the circumferential wall portion of the cup-shaped container and form three sides of a quadrangle including an upper side formed in the circumferential direction and two sides extending axially and downward from two ends of the upper side, and the protruding portion has at least a distal end portion corresponding to the upper side of the protruding portion which engages with the inner wall surface of the recess in the igniter-fixing portion.

The above quadrangle includes a rectangle, a square, a trapezoid, or the like.

The recess is in a size sufficient to enable the engagement of the distal end portion of the protruding portion.

Embodiment 3

The gas generator for a restraining apparatus according to the invention can include the following features.

The cup-shaped container has a quadrangular opening bounded by a first upper side and a first lower side formed with a spacing and extending in the circumferential direction of the circumferential wall portion, and two first sides connecting the first upper side and the first lower side, the protruding portion of the cup-shaped container is formed by bending inward a circumferential wall portion corresponding to a quadrangle formed by the first lower side, two cutting lines, which are the two second sides, and one remaining side, the three sides of the quadrangle including the first lower side, the two cutting lines which penetrate through the circumferential wall portion of the cup-shaped container and include two second sides extending downward from the two first sides axially of the cup-shaped container, and at least a distal end portion corresponding to the first lower side of the protruding portion engages with the inner wall surface of the recess of the igniter-fixing portion.

The opening may also function as a flame-transferring hole.

The quadrangle includes a rectangle, a square, a trapezoid, or the like.

The recess is in a size sufficient to enable the engagement of the distal end portion of the protruding portion.

Embodiment 4

The gas generator for a restraining apparatus according to the invention can include the following features.

A protruding portion of the cup-shaped container is formed by bending inward a circumferential wall portion corresponding to a triangle formed by two cutting lines, which penetrate through the circumferential wall portion of the cup-shaped container and form two sides of the triangle, and one remaining side, and at least a distal end portion of the protruding portion bent in the triangular shape engages with the inner wall surface of the recess of the igniter-fixing portion.

The triangle may be an equilateral or isosceles triangle.

The recess is in a size sufficient to enable the engagement of the distal end portion of the protruding portion.

Embodiment 5

The gas generator for a restraining apparatus according to the invention can include the following features.

The cup-shaped member has a quadrangular opening, a protruding portion of the cup-shaped container is formed by pushing inward the circumferential wall portion below the quadrangular opening, the quadrangular opening is bounded by two lines of an upper side and the lower side, formed along the circumferential direction of the circumferential wall portion, and two lines formed in the height direction, and at least a distal end portion of the protruding portion engages with the inner wall surface of the recess of the igniter-fixing portion.

The quadrangle can be a rectangle, a square, a trapezoid, or the like.

The recess is in a size sufficient to enable the engagement of the distal end portion of the protruding portion.

Embodiment 6

The gas generator for a restraining apparatus according to the invention can include the following features.

A protruding portion of the cup-shaped container is formed by pushing inward a circumferential wall portion positioned between upper and lower openings, the upper and lower openings are two quadrangular openings formed one upon the other with a spacing in the height direction, each of the quadrangular opening is bounded by two lines of an upper side and a lower side, formed in the circumferential direction of the circumferential wall portion, and two lines formed in the height direction, and at least a distal end portion of the protruding portion engages with the inner wall surface of the recess of the igniter-fixing portion.

The quadrangle can be a rectangle, a square, a trapezoid, or the like. The two quadrangles may be of the same as or different from each other, but the quadrangles of the same shape are preferred.

The recess is in a size sufficient to enable the engagement of the distal end portion of the protruding portion.

Embodiment 7

The gas generator for a restraining apparatus according to the invention can include the following features.

A protruding portion of the cup-shaped container is formed by pushing inward a circumferential wall portion located below a cutting line formed in the circumferential direction of the circumferential wall portion of the cup-shaped container, penetrating through the circumferential wall portion, and at least a distal end portion of the protruding portion engages with the inner wall surface of the recess of the igniter-fixing portion.

The recess is in a size sufficient to enable the engagement of the distal end portion of the protruding portion.

Embodiment 8

The gas generator for a restraining apparatus according to the invention can include the following features.

A protruding portion of the cup-shaped container is formed by pushing inward a circumferential wall portion sandwiched between two cutting lines formed with a spacing in the axial direction and penetrating through the circumferential wall portion in the circumferential direction of the cup-shaped container, and at least a distal end portion of the protruding portion engages with the inner wall surface of the recess of the igniter-fixing portion.

The recess is in a size sufficient to enable the engagement of the distal end portion of the protruding portion.

Embodiment 8-1

The gas generator for a restraining apparatus according to the invention can include the following features.

A protruding portion of the cup-shaped container is formed by pushing inward a circumferential wall portion sandwiched between two cutting lines formed with a spacing in the axial direction and penetrating through the circumferential wall portion in the circumferential direction of the cup-shaped container, the plan shape of the recess of the igniter-fixing portion is the same as that of the protruding portion, and at least a distal end portion of the protruding portion engages with the inner wall surface of the recess of the igniter-fixing portion.

The recess is in a size sufficient to enable the engagement of the distal end portion of the protruding portion.

Embodiment 9

The gas generator for a restraining apparatus according to the invention can include the following features.

The cup-shaped container and the tubular igniter-fixing portion are assembled such that an inner circumferential surface of the cup-shaped container and an outer circumferential surface of the igniter-fixing portion that directly opposes the inner circumferential surface are in contact with each other.

Embodiment 10

The gas generator for a restraining apparatus according to the invention can include the following features.

The cup-shaped container and the tubular igniter-fixing portion are assembled such that an inner circumferential surface of the cup-shaped container and an outer circumferential surface of the igniter-fixing portion that is directly opposite the inner circumferential surface are spaced apart.

When the recess for engaging with the protruding portion of the cup-shaped container is formed by cutting work, the recess formed in the outer circumferential surface of the tubular igniter-fixing portion can be such that the angle ($\alpha$) formed by the outer circumferential surface and the tangent line of the inner wall surface of the recess onto which the distal end portion of the protruding portion abuts is 90°, and the recess formed in the outer circumferential surface of the tubular igniter-fixing portion can be such that the angle ($\alpha$) formed by the outer circumferential surface and the tangent line of the inner wall surface of the recess onto which the distal end portion of the protruding portion abuts is within a range of 30° to 80°.

When the aforementioned angle ($\alpha$) of the recess is 30° to 80°, the inner wall surface of the recess which the distal end portion of the protruding portion engages with is formed sharper to the inner side. Therefore, the function for preventing the cup-shaped container from moving in the axial direction is enhanced. Because of the state in which the inner wall surface is thus cut into the inner side with a sharp angle, the thickness of the entire protruding portion or the thickness of only the distal end portion can be decreased by comparison with that in the case where the angle ($\alpha$) of the recess is 90°.

Meanwhile, when the recess to be assembled with the protruding portion of the cup-shaped container is formed by pressing, the angle ($\alpha$) can be obtuse, but an action for preventing the movement can be sufficiently demonstrated by the combination of the recess and the protruding portion when the shape or thickness of the distal end portion of the protruding portion is adjusted as appropriate.

The gas generator for a restraining apparatus in accordance with the present invention demonstrates the following effects: processing of the cup-shaped container used as a component is facilitated, the cup-shaped container can be easily attached, the weight is reduced by comparison with the conventional configuration (JP-A No. 2006-076849), and the cup-shaped container can be strongly fixed.

EMBODIMENTS OF INVENTION

The gas generator in accordance with the present invention is characterized by the attachment state of a cup-shaped container and a tubular igniter-fixing portion. Other structural features may be identical to those of a conventional gas generator. Embodiments of the present invention will be described below.

Figure 2:
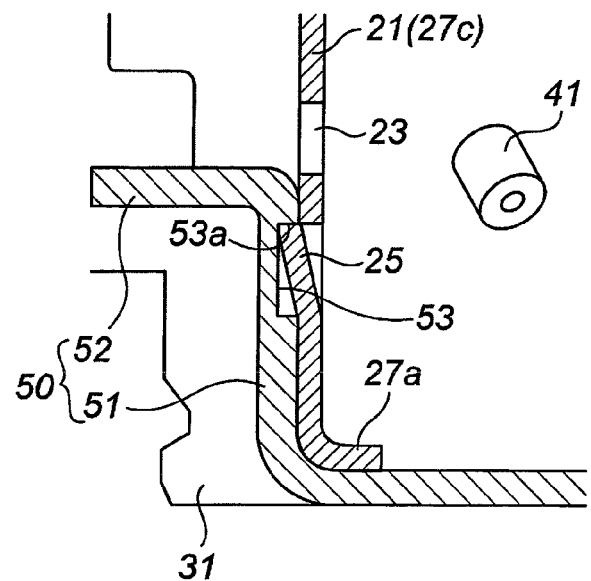
FIG. 2 is a partial cross-sectional view of the configuration shown in FIG. 1.
Figure 3:
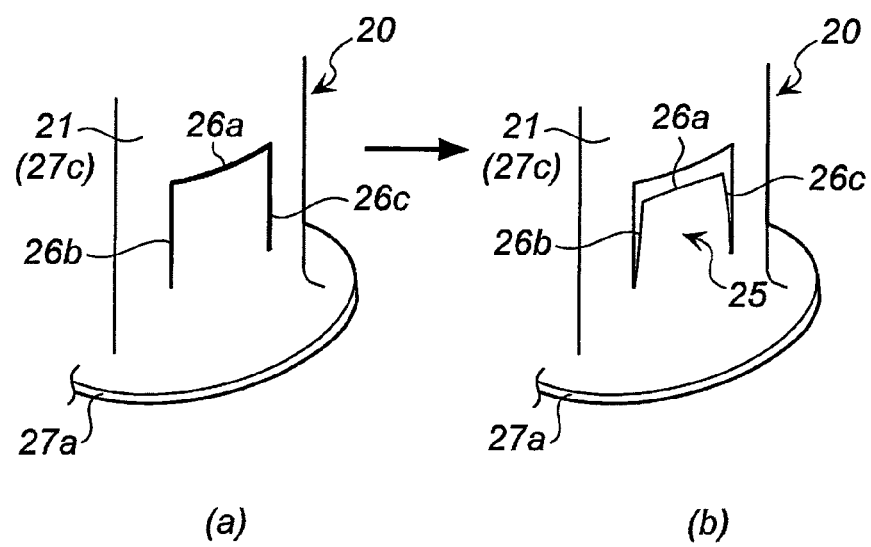
FIG. 3 is, in (a) and (b), a perspective view illustrating a method for manufacturing the cup-shaped container that is used in the configuration shown in FIG. 1.

(1) Gas Generator Shown in FIGS. 1 to 3

A housing 10 is obtained by welding and integrating a diffuser shell 11 having a plurality of gas discharge ports 13 and a closure shell 12.

A cup-shaped container 20, including a tubular portion 21 and a lid 22 fixed to close an opening at one end (in the diffuser shell 11 side) of the tubular portion 21, is disposed in the center portion of the closure shell 12.

In the cup-shaped container 20, the end portion closed by the lid portion 22 may be an integrally-formed closed surface as a ceiling surface, but preferably the cup-shaped container 20 is combined with the lid 22 since in terms of convenience for accommodation of a transfer charge 35 and an igniter 30.

The tubular portion 21 of the cup-shaped container 20 has a flange portion 27a formed at an opening in the closure shell side, an inner bent portion 27b for fixing the lid 22, and a circumferential wall portion 27c, and further has a plurality of flame-transferring holes 23 that penetrate through the circumferential wall portion 27c.

The interior of the cup-shaped container 20 serves as an ignition device chamber 24 where the ignition device including the electric igniter 30 and the transfer charge 35 is accommodated.

The outside of the cup-shaped container 20 serves as a combustion chamber 40 and is charged with a solid gas generating agent 41.

Inside the housing 10, a cylindrical filter 45 is disposed with a distance from the circumferential wall portion of the housing 10.

The igniter 30 accommodated inside the ignition device chamber 24 inside the cup-shaped container 20 is enclosed in a resin portion 31 and fixed by the resin portion 31 to a tubular igniter-fixing portion 50 which is formed integrally with the closure shell 12.

The igniter-fixing portion 50 has a tubular wall portion 51 provided vertically from the center portion of the closure shell 12 and an annular flat plate portion 52 obtained by inwardly bending the tubular wall portion 51.

The igniter 30 is fixed to the igniter-fixing portion 50 such that the outer surface of the resin portion 31 and the inner surface of the tubular wall portion 51 are in close contact with each other and the annular flat plate portion 52 is embedded in the resin portion 31.

The cup-shaped container 20 has a plurality of protruding portions 25 that protrude radially inward from the circumferential wall portion 27c of the tubular container, i.e. the tubular portion 21.

The protruding portion 25 shown in FIG. 1 is formed integrally with the circumferential wall portion 27c and can be formed as shown in FIG. 2 and FIG. 3.

The protruding portion 25 shown in FIG. 2 and FIG. 3 will be described below.

(a) in FIG. 3 is a perspective view illustrating the stage before the protruding portion 25 shown in (b) in FIG. 3 is formed.

As shown in (a) in FIG. 3, three cutting lines 26a to 26c forming three sides of a quadrangle are provided in the circumferential wall portion 27c of the cup-shaped container 21, those lines including the upper side 26a penetrating through the circumferential wall portion in the circumferential direction and two sides 26b, 26c extending axially downward from both ends of the upper side 26a.

As shown in FIG. 2 and (b) in FIG. 3, the protruding portion 25 is formed by bending inward the circumferential wall portion 27c corresponding to a quadrangle formed by the three cutting lines 26a to 26c and a portion serving as one remaining side (one remaining side on the flange portion 27a side).

The tubular igniter-fixing portion 50 has a recess 53 in the outer surface of the tubular wall portion 51. The protruding portion 25 engages with the recess. The recess 53 (annular groove) is formed continuously in the circumferential direction in the outer surface of the tubular wall portion 51. The recess 53 is formed by press work.

A distal end portion 26a (portion identical to the upper side 26a) of the protruding portion 25 of the cup-shaped container 20 engages with an inner wall surface 53a at the upper end (in the ceiling surface 11a side of the diffuser shell 11) of the recess 53 in the igniter-fixing portion 50.

As a result, even when a force is applied to the cup-shaped container 20 in the direction of the diffuser shell 11, since the upper side 26a side protrudes inward, the protruding portion 25 offers resistance to the aforementioned force and the cup-shaped container 20 is unlikely to disconnect from the igniter-fixing portion 50.

An embodiment of the method for assembling the gas generator shown in FIGS. 1 to 3 will be explained below.

(I) The igniter 30 (resin portion 31) is fixed to the igniter-fixing portion 50 of the closure shell 12, followed by the step of providing the cup-shaped container 20 thereon. In this case, the position of the portion surrounded by the sides 26a, 26b, 26c in the cup-shaped container 20 shown in FIG. 3(a) is adjusted such that the portion directly opposes the recess 53 of the igniter-fixing portion 50.

(II) The portion surrounded by the sides 26a, 26b, 26c shown in FIG. 3(a) is pushed from the outside, the protruding portion 25 shown in FIG. 3(b) is formed, and the distal end portion of the protruding portion 25 is engaged with the inner wall surface 53a of the recess as shown in FIG. 2.

In the process (II), when the portion surrounded by the sides 26a, 26b, 26c shown in FIG. 3(a) is pushed from the outside, the height of the circumferential wall portion of the closure shell 12 is greater than the height of the aforementioned pushed-in portion. Therefore, a pushing tool used as the pushing device is such that can be applied from above the cup-shaped container 20 and can push inward.

(III) Then, the transfer charge 35 is loaded, the lid 22 is attached, and the upper end portion 21b of the tubular portion 21 is crimped. The cylindrical filter 45 is then disposed, the gas generating agent 41 is loaded, and the diffuser shell 11 is then placed from above and integrated by welding with the closure shell 12.

The operation of the gas generator shown in FIGS. 1 to 3 will be explained below.

In the gas generator shown in FIGS. 1 to 3, the distal end portion 26a of the protruding portion 25 of the cup-shaped container engaged with the inner wall surface 53a at the upper end (in the ceiling surface 11a side of the diffuser shell 11) of the recess 53 in the igniter-fixing portion.

When the igniter 30 is actuated and the transfer charge 35 is ignited and burned, the generated flame and high-temperature gas are released from the plurality of flame-transferring holes 23 into the combustion chamber 40 and the gas generating agent 41 is ignited and burned.

In this case, a force is applied in the axial direction (in the direction toward the ceiling surface 11a of the diffuser shell 11) to the cup-shaped container 20, but the cup-shaped container 20 is prevented from moving in the axial direction because the distal end portion 26a of the protruding portion 25 is pressed against the inner wall surface 53a at the upper end side of the recess 53.

Figure 4:
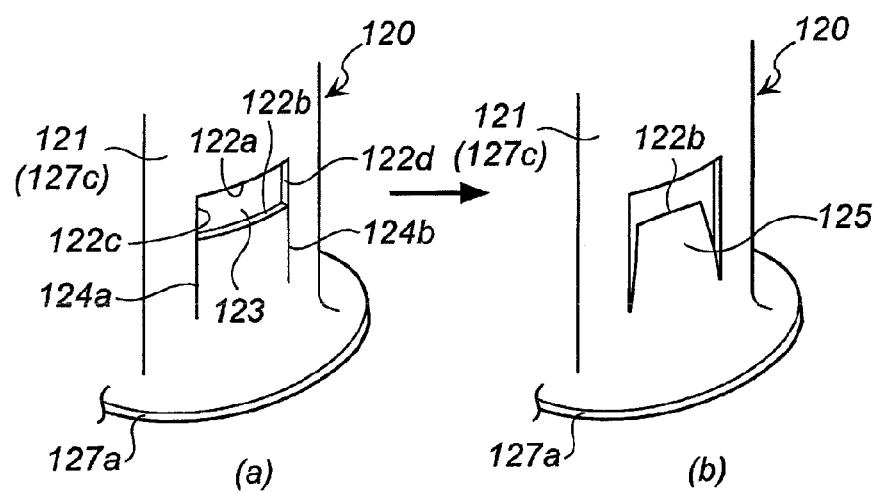
FIG. 4 is, in (a) and (b), a perspective view illustrating a method for manufacturing a cup-shaped container of an embodiment other than that used in the configuration shown in FIG. 1.

(2) Embodiment Shown in FIG. 4

FIG. 4 illustrates an embodiment in which a shape of the protruding portion differs from that of the cup-shaped container 20 shown in FIGS. 1 to 3.

(a) in FIG. 4 is a perspective view illustrating a state before a protruding portion 125 shown in FIG. 4(b) is formed.

As shown in (a) in FIG. 4, the cup-shaped container 120 has a quadrangular opening 123 bounded by a first upper side 122a and a first lower side 122b formed with a spacing and extending in the circumferential direction of a circumferential wall portion 127c of the tubular container, i.e. the tubular portion 121 and two first sides 122c, 122d connecting the first upper side 122a and the first lower side 122b. The reference numeral 127a denotes a flange portion.

Further, as shown in (a) in FIG. 4, the circumferential wall portion 127c of the cup-shaped container 120 has the first lower side 122b and two cutting lines which are two second sides 124a, 124b extending downward in the axial direction from the two first sides 122c, 122d, and these cutting lines penetrating through the circumferential wall portion 121 of the cup-shaped container.

As shown in (b) in FIG. 4, a protruding portion 125 is formed by bending inward the circumferential wall portion 127c within a range corresponding to a quadrangle formed by the three sides 122b, 124a, 124b and a portion serving as the remaining one side.

When the cup-shaped container 120 shown in FIG. 4 is used in the gas generator shown in FIG. 1, a distal end portion 122b (the portion identical to the first lower side 122b) of the protruding portion 125 in the cup-shaped container engaged with the inner circumferential surface 53a at the upper end (in the ceiling surface 11a side of the diffuser shell 11) of the recess 53 in the igniter-fixing portion 50.

Figure 5:
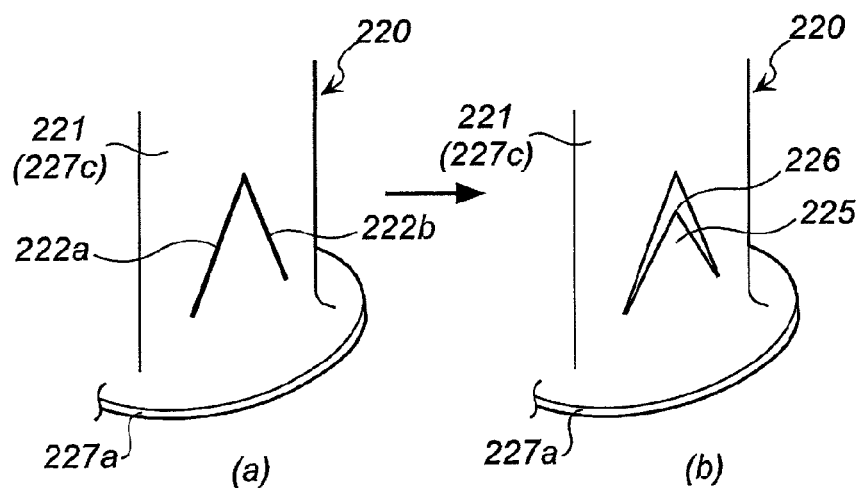
FIG. 5 is, in (a) and (b), a perspective view illustrating a method for manufacturing a cup-shaped container of an embodiment other than that used in the configuration shown in FIG. 1.

(3) Embodiment Shown in FIG. 5

FIG. 5 illustrates an embodiment in which a shape of the protruding portion differs from that of the cup-shaped container 20 shown in FIGS. 1 to 3.

(a) in FIG. 5 is a perspective view illustrating a state before a protruding portion 225 shown in (b) in FIG. 5 is formed.

As shown in (a) in FIG. 5, a circumferential wall portion 227c of a tubular portion 221 of a cup-shaped container 220 has two cutting lines 222a, 222b serving as two sides of a triangle penetrating through the circumferential wall portion. The reference numeral 227a denotes a flange portion.

As shown in (b) in FIG. 5, a protruding portion 225 is formed by bending inward the circumferential wall portion 227c corresponding to a triangle formed by the two cutting lines 222a, 222b and a portion serving as one remaining side.

When the cup-shaped container 220 shown in (b) in FIG. 5 is used in the gas generator shown in FIG. 1, a distal end portion 226 (an intersection point portion of the two cutting lines 222a, 222b) of the protruding portion 225 in the cup-shaped container engages with the inner circumferential surface 53a (see FIG. 2) at the upper end (in the ceiling surface 11a side of the diffuser shell 11) of the recess 53 in the igniter-fixing portion 50.

Figure 6:
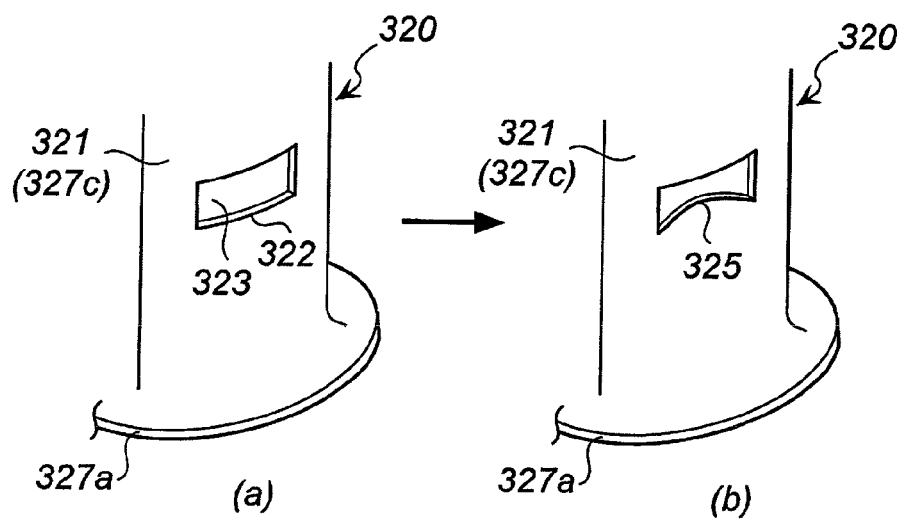
FIG. 6 is, in (a) and (b), a perspective view illustrating a method for manufacturing a cup-shaped container of an embodiment other than that used in the configuration shown in FIG. 1.

(4) Embodiment Shown in FIG. 6

FIG. 6 illustrates an embodiment in which a shape of the protruding portion differs from that of the cup-shaped container 20 shown in FIGS. 1 to 3.

(a) in FIG. 6 is a perspective view illustrating a state before a protruding portion 325 shown in (b) in FIG. 6 is formed.

As shown in (a) in FIG. 6, a circumferential wall portion 327c of a tubular portion 321 in a cup-shaped container 320 has a quadrangular opening 323 bounded by two lines of an upper side and a lower side formed along the circumferential direction and two lines formed in the height direction. The reference numeral 327a denotes a flange portion As shown in (b) in FIG. 6, the protruding portion 325 is formed by pushing inward the circumferential wall portion 327c that is in contact with the lower side 322 forming the opening 323.

When the cup-shaped container 320 shown in (b) in FIG. 6 is used in the gas generator shown in FIG. 1, the distal end portion of the protruding portion 325 of the cup-shaped container engages with the inner wall surface 53a (see FIG. 2) at the upper end (in the ceiling surface 11a side of the diffuser shell 11) of the recess 53 of the igniter-fixing portion 50. The recess 53 is in a size sufficient to enable the engagement with the protruding portion 325.

Figure 7:
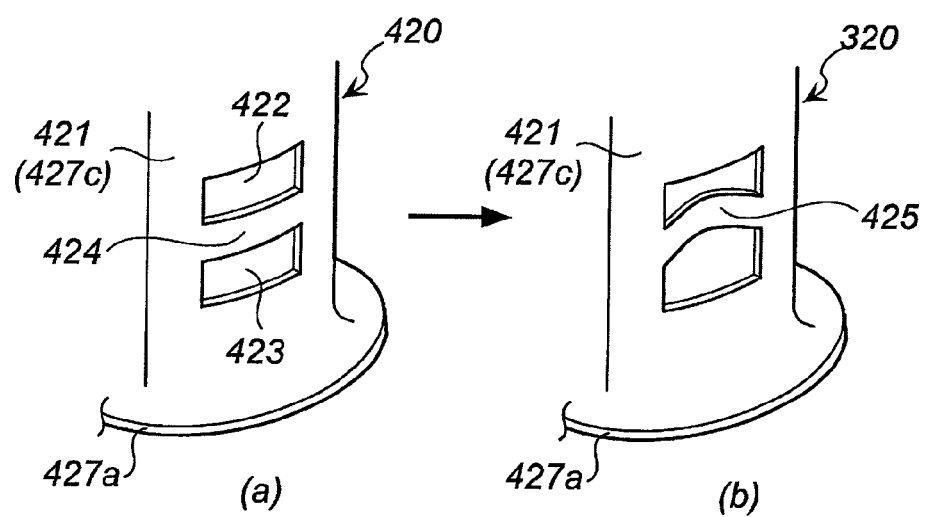
FIG. 7 is, in (a) and (b), a perspective view illustrating a method for manufacturing a cup-shaped container of an embodiment other than that used in the configuration shown in FIG. 1.

(5) Embodiment Shown in FIG. 7

FIG. 7 illustrates an embodiment in which a shape of the protruding portion differs from that of the cup-shaped container 20 shown in FIGS. 1 to 3.

(a) in FIG. 7 is a perspective view illustrating a state before a protruding portion 425 shown (b) in FIG. 7 is formed.

As shown in (a) in FIG. 7, a circumferential wall portion 427c of a tubular portion 421 in a cup-shaped container 420 has a first opening 422 and a second opening 423 that are formed one above the other with a spacing in the height direction. Each opening has a quadrangular shape bounded by two lines of an upper side and a lower side formed along the circumferential direction and two lines formed in the height direction. The reference numeral 427a denotes a flange portion.

An intermediate circumferential wall portion 424 is present between the first opening 422 and the second opening 423.

Further, as shown in (b) in FIG. 7, the intermediate circumferential wall portion 424, which is present between the first opening 422 and the second opening 423, is pushed inward to form a protruding portion 425.

When the cup-shaped container 420 shown in (b) in FIG. 7 is used in the gas generator shown in FIG. 1, the distal end portion of the protruding portion 425 in the cup-shaped container engages with the inner wall surface 53a (see FIG. 2) at the upper end (in the ceiling surface 11a side of the diffuser shell 11) of the recess 53 in the igniter-fixing portion 50. The recess 53 is in a size sufficient to enable the engagement with the protruding portion 425.

Figure 8:
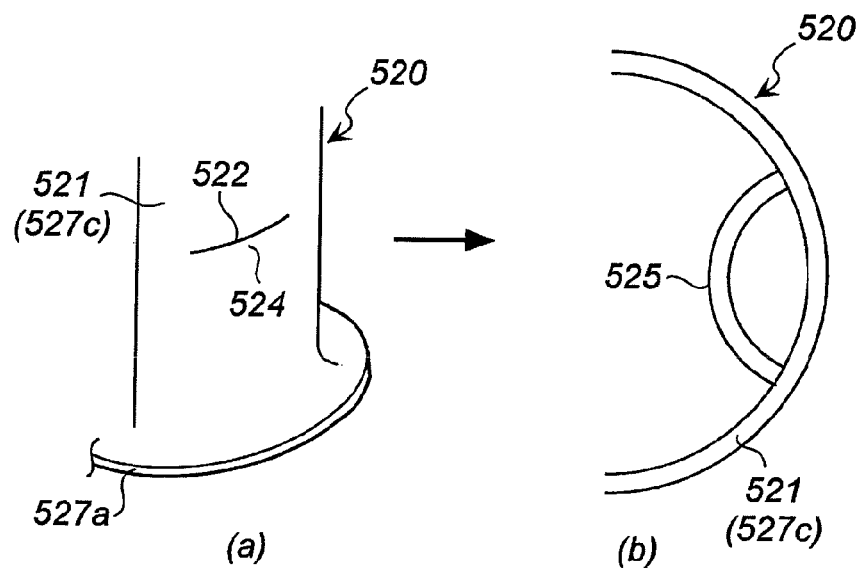
FIG. 8 is, in (a), a perspective view illustrating a method for manufacturing a cup-shaped container of an embodiment other than that used in the configuration shown in FIG. 1.

(6) Embodiment Shown in FIG. 8

FIG. 8 illustrates an embodiment in which a shape of the protruding portion differs from that of the cup-shaped container 20 shown in FIGS. 1 to 3.

(a) in FIG. 8 is a perspective view illustrating a state before a protruding portion 525 shown in (b) in FIG. 8 is formed. (b) in FIG. 8 is a plan view (in this view, a flange portion 527a is omitted) illustrating a state in which the ceiling surface side of a cup-shaped container 520 is removed.

As shown in (a) in FIG. 8, a circumferential wall portion 527c of a tubular portion 521 in the cup-shaped container 520 has one cutting line 522 penetrating through the circumferential wall portion and extending in the circumferential direction. The reference numeral 527a denotes a flange portion.

Further, as shown in (b) in FIG. 8, the protruding portion 525 is formed by pushing a circumferential wall portion 524 located below the cutting line 522 inward.

When the cup-shaped container 520 shown in (b) in FIG. 8 is used in the gas generator shown in FIG. 1, the distal end portion of the protruding portion 525 of the cup-shaped container engages with the inner wall surface 53a (see FIG. 2) at the upper end (in the ceiling surface 11a side of the diffuser shell 11) of the recess 53 in the igniter-fixing portion 50. The recess 53 is in a size sufficient to enable the engagement with the protruding portion 525.

Figure 9:
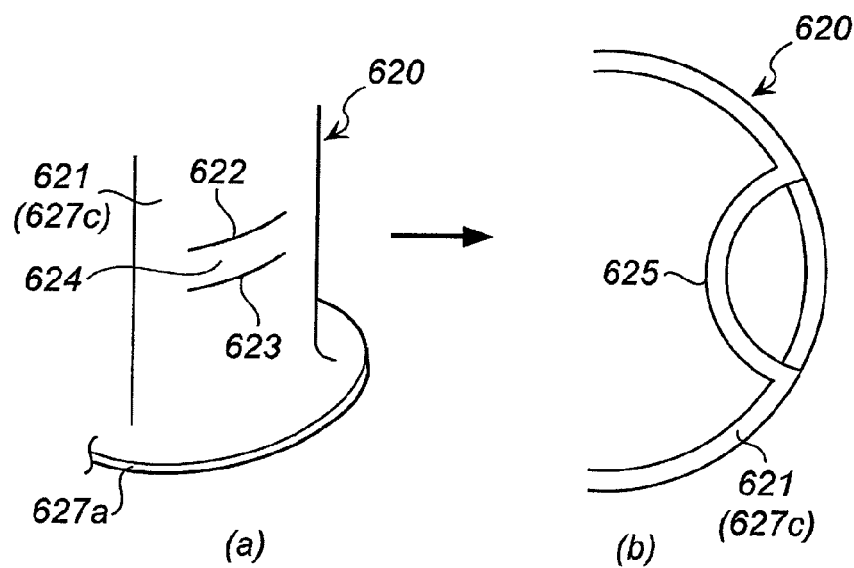
FIG. 9 is, in (a), a perspective view illustrating a method for manufacturing a cup-shaped container of an embodiment other than that used in the configuration shown in FIG. 1.

(7) Embodiment Shown in FIG. 9

FIG. 9 illustrates an embodiment in which a shape of the protruding portion differs from that of the cup-shaped container 20 shown in FIGS. 1 to 3.

(a) in FIG. 9 is a perspective view illustrating a state before a protruding portion 625 shown in (b) in FIG. 9 is formed. (b) in FIG. 9 is a plan view (in this view, a flange portion 627a is omitted) illustrating a state in which the ceiling surface side of a cup-shaped container is removed.

As shown in (a) in FIG. 9, a circumferential wall portion 627c of a tubular portion 621 in a cup-shaped container 620 has an intermediate circumferential wall portion 624 sandwiched between two cutting lines 622, 623 formed with a spacing in the axial direction, and penetrating through the circumferential wall portion and extending in the circumferential direction. The reference numeral 627a denotes a flange portion.

Further, as shown in (b) in FIG. 9, the protruding portion 625 is formed by pushing the intermediate circumferential wall portion 624 inward.

When the cup-shaped container 620 shown in (b) in FIG. 9 is used in the gas generator shown in FIG. 1, the distal end portion of the protruding portion 625 of the cup-shaped container engages with the inner wall surface 53a (see FIG. 2) at the upper end (in the ceiling surface 11a side of the diffuser shell 11) of the recess 53 in the igniter-fixing portion 50. The recess 53 in a size sufficient to enable the engagement with the protruding portion 625.

Figure 10:
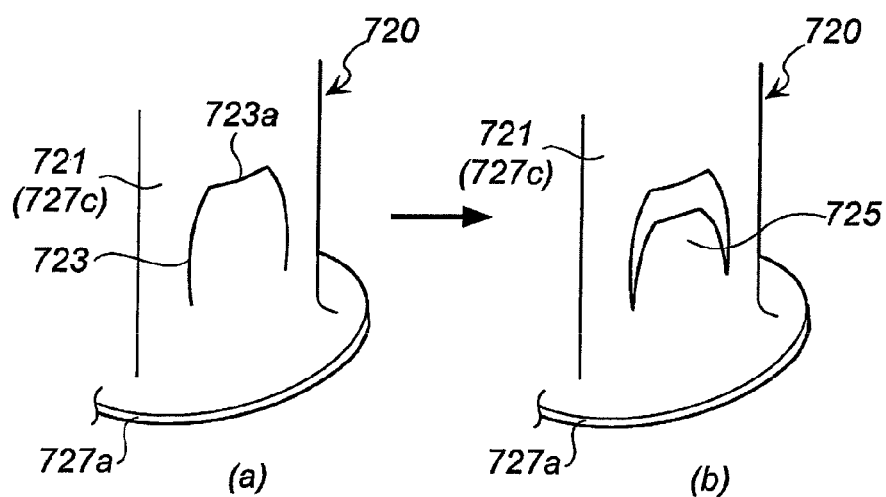
FIG. 10 is, in (a) and (b), a perspective view illustrating a method for manufacturing a cup-shaped container of an embodiment other than that used in the configuration shown in FIG. 1.

(8) Embodiment Shown in FIG. 10

FIG. 10 illustrates an embodiment in which a shape of the protruding portion differs from that of the cup-shaped container 20 shown in FIGS. 1 to 3.

(a) in FIG. 10 is a perspective view illustrating a state before a protruding portion 725 shown in (b) in FIG. 10 is formed.

As shown in (a) in FIG. 10, a circumferential wall portion 727c of a tubular portion 721 in a cup-shaped container 720 has a cutting line 723 formed in a substantially elliptical shape and penetrating through the circumferential wall portion. However, a portion 723a of the ellipse is a straight line, not a curved line. The reference numeral 727a denotes a flange portion.

Further, as shown in (b) in FIG. 10, the protruding portion 725 is formed by pushing the substantially elliptical cutting line 723 inward.

When the cup-shaped container 720 shown in (b) in FIG. 10 is used in the gas generator shown in FIG. 1, the distal end portion (the portion corresponding to that denoted by the reference numeral 723a in (a) in FIG. 10) of the protruding portion 725 in the cup-shaped container engages with the inner wall surface 53a (see FIG. 2) at the upper end (in the ceiling surface 11a side of the diffuser shell 11) of the recess 53 in the igniter-fixing portion 50.

Figure 11:
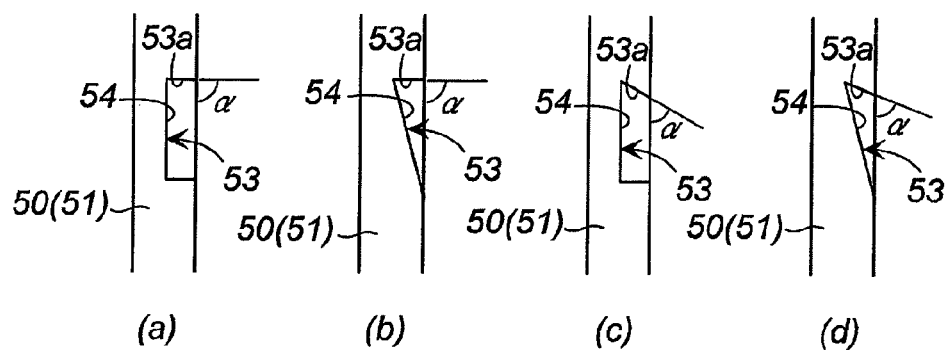
FIG. 11 is, in (a) to (d), an explanatory drawing illustrating different embodiments of the recess in the igniter-fixing portion used in the configuration shown in FIG. 1.

(9) Embodiment Shown in FIG. 11

(a) to (d) in FIG. 11 are axial sectional views illustrating different embodiments of the recess 53 provided in the outer circumferential surface of the igniter-fixing portion 50 shown in FIGS. 1 and 2.

As shown in (a) and (b) in FIG. 11, in the recess 53 formed in the outer circumferential surface of the tubular igniter-fixing portion 50 (the tubular wall portion 51), the angle (α) formed by the outer circumferential surface of the tubular wall portion 51 and the tangent line of the inner wall surface 53a in the recess 53 onto which the distal end portion 26a (see FIGS. 2 and 3) of the protruding portion 25 abuts is 90°.

The depth of the inner wall surface 53a (that is, the depth of the bottom surface 54) is equal to or greater than the thickness of the distal end portion 26a of the protruding portion 25.

In (a) in FIG. 11, the bottom surface 54 of the recess 53 is parallel to the outer circumferential surface of the tubular wall portion 51.

In (b) in FIG. 11, the bottom surface 54 of the recess 53 is inclined with respect to the outer circumferential surface of the tubular wall portion 51 so that the depth thereof decreases gradually from the inner wall surface 53a. The recess 53 shown in (b) in FIG. 11 is preferred because the protruding portion 25 engages with the inner wall surface 53a along the inclined bottom surface 54.

As shown in (c) and (d) in FIG. 11, in the recess 53 formed in the outer circumferential surface of the tubular igniter-fixing portion 50 (tubular wall portion 51), the angle (α) formed by the outer circumferential surface of the tubular wall portion 51 and the tangent line of the inner wall surface 53a (see FIG. 2) in the recess 53 onto which the distal end portion 26a (see FIGS. 2 and 3) of the protruding portion 25 abuts is 30° to 80°.

In (c) in FIG. 11, the bottom surface 54 of the recess 53 is parallel to the outer circumferential surface of the tubular wall portion 51.

In (d) in FIG. 11, the bottom surface 54 of the recess 53 is inclined with respect to the outer circumferential surface of the tubular wall portion 51 so that the depth thereof decreases gradually from the inner wall surface 53a. The recess 53 shown in (d) in FIG. 11 is preferred because the protruding portion 25 engages with the inner wall surface 53a along the inclined bottom surface 54.

When the angle (α) is 30° to 80°, as in the embodiments shown in (c) and (d) in FIG. 11, the inner wall surface 53a in the recess 53 onto which the distal end portion 26a of the protruding portion 25 will abut is cross-sectionally formed with an acute angle.

Therefore, when the distal end portion 26a of the protruding portion 25 is engaged with the inner wall surface 53a of the recess 53 as shown in FIG. 2, the distal end portion 26a can fit into the inner wall surface 53a of the recess and therefore the function preventing the cup-shaped container 20 from moving in the axial direction is enhanced. In this case, the thickness of the protruding portion 25 can be adjusted such as to enable to fit into the inner wall surface 53a of the recess shown in (c) and (d) in FIG. 11.

In the protruding portion 25 that is combined with the recess 53 such as shown in (c) and (d) in FIG. 11, the thickness of the entire protruding portion or the thickness of only the distal end portion 26a can be adjusted for engagement with the inner wall surface 53a of the recess.

Figure 12:
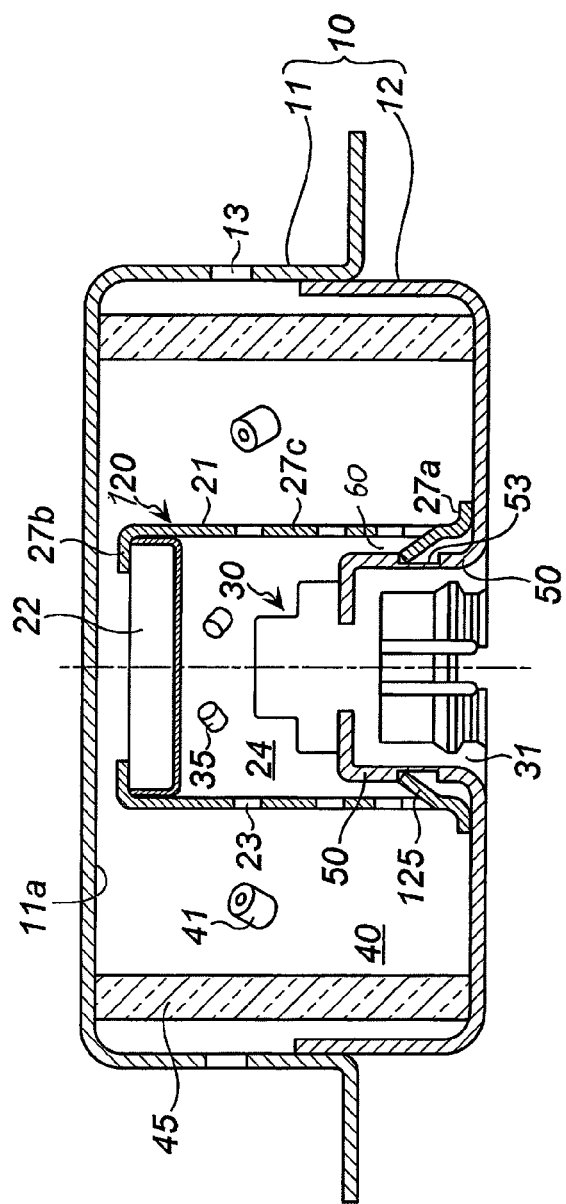
FIG. 12 is an axial sectional view of the gas generator of an embodiment other than that shown in FIG. 1.
Figure 13:
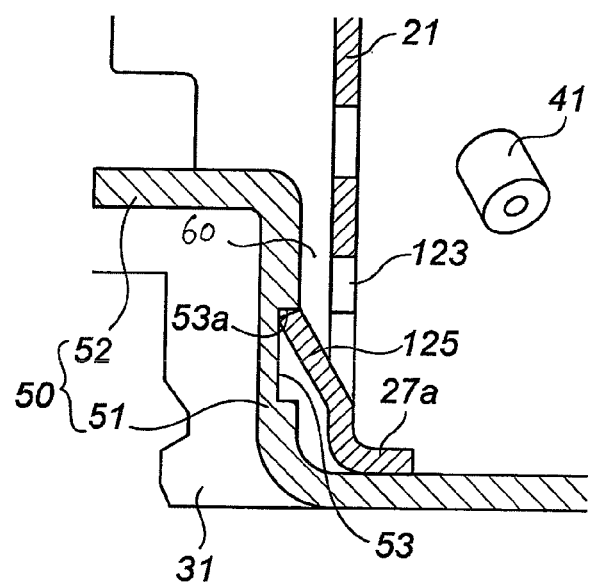
FIG. 13 is a partial sectional view of the configuration shown in FIG. 12.

(10) Gas Generator Shown in FIGS. 12 and 13

The gas generator shown in FIG. 12 is identical to the gas generator shown in FIG. 1, except that the cup-shaped container 120 and the tubular igniter-fixing portion 50 are assembled such that the inner circumferential surface of the cup-shaped container 120 and the outer circumferential surface of the igniter-fixing portion 50 form together a gap 60 and that the cup-shaped container 120 shown in FIG. 4 is used instead of the cup-shaped container 20 shown in FIG. 1.

The size of the gap 60 is adjusted such that the transfer charge 35 cannot enter therein.

In the gas generator shown in FIGS. 12 and 13, the distal end portion of the protruding portion 125 in the cup-shaped container engages with the inner circumferential surface 53a at the upper end (in the ceiling surface 11a side of the diffuser shell 11) of the recess 53 in the igniter-fixing portion.

When the igniter 30 is actuated and the transfer charge 35 is ignited and burned, the generated flame and high-temperature gas are released from the flame-transferring holes 23 into the combustion chamber 40.

In this case, a force is applied in the axial direction (in the direction toward the ceiling surface 11a of the diffuser shell 11) to the cup-shaped container 120, but the cup-shaped container 120 is prevented from moving in the axial direction because the distal end portion of the protruding portion 125 is pressed against the inner wall surface 53a at the upper end side of the recess 53.

Further, in the gas generator shown in FIGS. 12 and 13, the gap 60 (a tubular gap) is formed between the cup-shaped container 120 and the tubular igniter-fixing portion 50. Therefore, when the igniter 30 is actuated and the transfer charge 35 is burned, the flame and high-temperature gas passes through the gap 60 and are released from the flame-transferring holes 23 into the combustion chamber 40.

Further, since the cup-shaped container 120 shown in FIG. 4 is used, the flame and high-temperature gas are also released into the combustion chamber 40 from the opening 123 located above the protruding portion 125.

Figure 14:
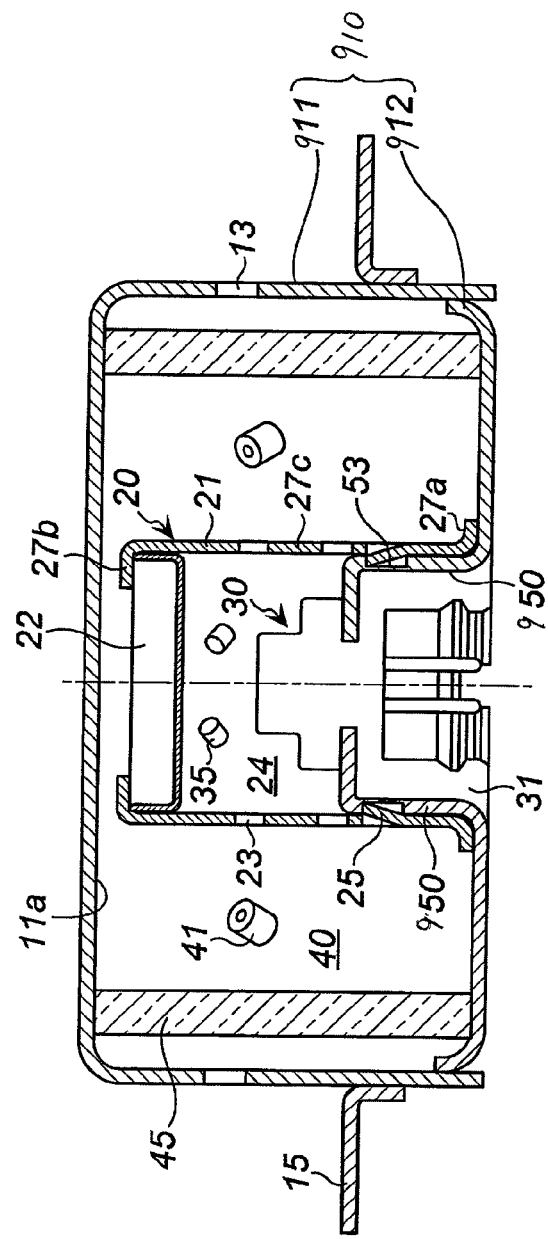
FIG. 14 is an axial sectional view of the gas generator of an embodiment other than that shown in FIG. 1.

(11) Gas Generator Shown in FIG. 14

The gas generator shown in FIG. 14 is identical to that shown in FIG. 1, except that the shapes of the diffuser shell 911 and the closure shell 912 are different.

In the gas generator shown in FIG. 14, the cup-shaped container 20 and the tubular igniter-fixing portion 950 can be also arranged such as to form the gap 60 such as shown in FIGS. 12 and 13.

In the housing 910 of the gas generator shown in FIG. 14, the length of the circumferential wall portion of the diffuser shell 911 is larger than that shown in FIG. 1, and the length of the circumferential wall portion of the closure shell 912 is less than that shown in FIG. 1. Therefore, the assembling method is different from that shown in FIG. 1.

In the method for assembling the gas generator shown in FIG. 14, the pushing method in process (II) among the processes (I) to (III) is different from that explained in relation to the method for assembling the gas generator shown in FIG. 1.

In the gas generator shown in FIG. 14, when the portion bounded by the sides 26a, 26b, 26c shown in (a) in FIG. 3 is pushed from the outside, the height of the push-in portion is greater than the height of the closure shell 912. Therefore, pushing can be performed from the lateral direction (that is, the direction perpendicular to the axial direction of the gas generator) of the push-in portion.

Further, in FIGS. 1 to 14, the recess 53 is an annular groove formed in the tubular wall portion 51 of the igniter-fixing portion 50, but the recess may be provided in the plural forms independently at positions corresponding to the protruding portions 25, 125. In this case, the planar shape of the recess 53 is somewhat larger than the planar shape of the protruding portion. Such recesses can be formed by pressing or embossing.

Figure 15:
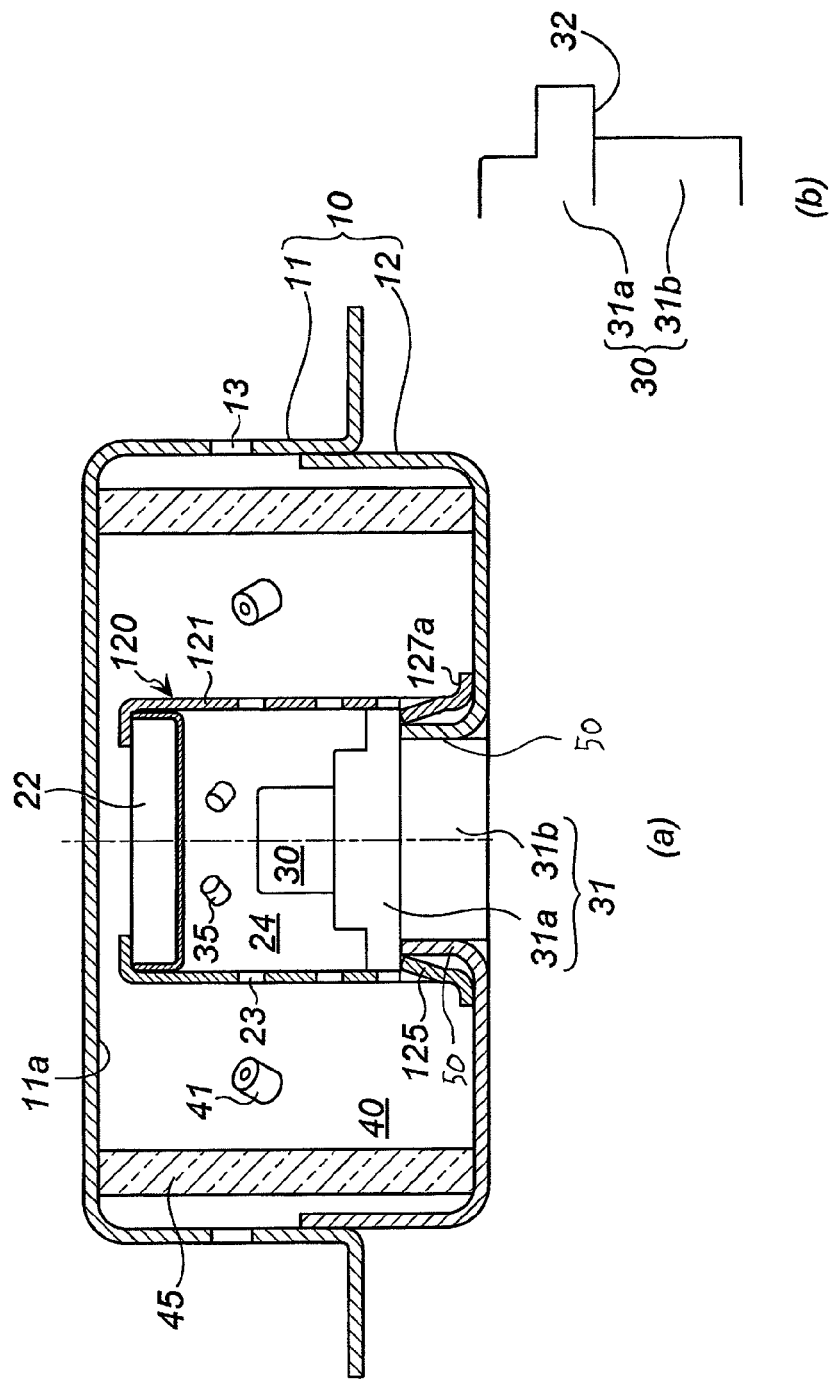
FIG. 15 is, in (a), an axial sectional view of the gas generator of an embodiment other than that shown in FIG. 1.

(12) Gas Generator Shown in FIG. 15

The gas generator shown in (a) in FIG. 15 differs from the gas generator shown in FIG. 1 in that the cup-shaped container 120 shown in FIG. 4 is used instead of the cup-shaped container 20 shown in FIG. 3 and that an assembly of the igniter-fixing portion 50 and a metal collar 31 is used instead of the recess 53 of the igniter-fixing portion 50. The metal collar 31 is fixed by welding to the igniter-fixing portion 50.

In the igniter 30, the ignition portion is enclosed by the metal collar 31, and the metal collar 31 has an upper metal collar 31a and a lower metal collar 31b.

The outer diameter of the upper metal collar 31a is larger than the outer diameter of the lower metal collar 31b. Therefore, a step surface 32 such as shown in (b) in FIG. 15 is present. The step surface 32 corresponds to the inner wall surface 53a of the recess 53 shown in FIGS. 1 to 3.

In the gas generator shown in (a) in FIG. 15, the distal end portion of the protruding portion 125 of the cup-shaped container 120 engages with the step surface 32, as shown in the figure.

In the gas generator shown in (a) and (b) in FIG. 15, when the igniter 30 is actuated and the transfer charge 35 is ignited and burned, the generated flame and high-temperature gas are released from the flame-transferring hole 23 into the combustion chamber 40.

In this case, a force in the axial direction (in the direction toward the ceiling surface 11a of the diffuser shell 11) is applied to the cup-shaped container 120, but since the distal end portion of the protruding portion 125 is pushed against the step surface 32, the cup-shaped container 120 is prevented from moving in the axial direction.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator for a restraining apparatus, comprising:
    a housing having a gas discharge port and formed by a closure shell and a diffuser shell;
    an ignition device, which includes an igniter, and a gas generating agent being accommodated in the housing; and
    a cup-shaped container having a flame-transferring hole in a circumferential wall portion thereof and being disposed on the closure shell inside the housing to form an ignition device chamber,
    the ignition device chamber accommodating the ignition device, and the igniter being fixed to a tubular igniter-fixing portion provided in the closure shell,
    the cup-shaped container having a plurality of protruding portions protruding inward in a radial direction from the circumferential wall portion thereof,
    the tubular igniter-fixing portion having a recess on an outer surface,
    at least a distal end portion of each of the plurality of protruding portions of the cup-shaped container abutting on an inner wall surface of the recess of the tubular igniter-fixing portion to block an axial movement of the cup-shaped container.

2. A gas generator for a restraining apparatus according to claim 1, wherein
    each of the plurality of protruding portions of the cup-shaped container is formed by bending the circumferential wall portion of the cup-shaped portion, corresponding to a quadrangle formed by three cutting lines and one remaining side,
    the three cutting lines penetrate through the circumferential wall portion of the cup-shaped container and form three sides of the quadrangle including an upper side formed in the circumferential direction and two sides extending axially and downward from two ends of the upper side, and
    each of the plurality of protruding portions has at least the distal end portion corresponding to the upper side of each of the plurality of protruding which engages with the inner wall surface of the recess in the igniter-fixing portion.

3. A gas generator for a restraining apparatus according to claim 1, wherein
    the cup-shaped container has a quadrangular opening bounded by a first upper side and a first lower side formed with a spacing and extending in the circumferential direction of the circumferential wall portion and two first sides connecting the first upper side and the first lower side,
    each of the plurality of protruding portions of the cup-shaped container is formed by bending inward the circumferential wall portion corresponding to a quadrangle formed by the first lower side, two cutting lines, which are the two second sides, and one remaining side,
    the three sides of the quadrangle including the first lower side, two cutting lines which penetrate through the circumferential wall portion of the cup-shaped container and include two second sides extending downward from the two first sides axially of the cup-shaped container, and
    at least the distal end portion corresponding to the first lower side of each of the plurality of protruding portions engages with the inner wall surface of the recess of the igniter-fixing portion.

4. A gas generator for a restraining apparatus according to claim 1, wherein
    a protruding portion of the cup-shaped container is formed by bending inward a circumferential wall portion corresponding to a triangle formed by two cutting lines, which penetrate through the circumferential wall portion of the cup-shaped container and form two sides of the triangle, and one remaining side, and
    at least the distal end portion of each of the plurality of protruding portions bent in the triangular shape engages with the inner wall surface of the recess of the igniter-fixing portion.

5. A gas generator for a restraining apparatus according to claim 1, wherein
    the cup-shaped member has a quadrangular opening,
    each of the plurality of protruding portions of the cup-shaped container is formed by pushing inward the circumferential wall portion below the quadrangular opening,
    the quadrangular opening is bounded by two lines of an upper side and a lower side, formed along the circumferential direction of the circumferential wall portion, and two lines formed in the height direction, and
    at least a distal end portion of each of the plurality of protruding portions engages with the inner wall surface of the recess of the igniter-fixing portion.

6. A gas generator for a restraining apparatus according to claim 1, wherein
- each of the plurality of protruding portions of the cup-shaped container is formed by pushing inward the circumferential wall portion positioned between upper and lower openings,
- the upper and lower openings are two quadrangular openings formed one upon the other with a spacing in the height direction,
- each of the quadrangular opening is bounded by two lines of an upper side and a lower side, formed in the circumferential direction of the circumferential wall portion, and two lines formed in the height direction, and
- at least the distal end portion of each of the plurality of protruding portions engages with the inner wall surface of the recess of the igniter-fixing portion.

7. A gas generator for a restraining apparatus according to claim 1, wherein
- each of the plurality of protruding portions of the cup-shaped container is formed by pushing inward the circumferential wall portion located below a cutting line formed in the circumferential direction of the circumferential wall portion of the cup-shaped container, penetrating through the circumferential wall portion, and
- at least the distal end portion of the protruding portion engages with the inner wall surface of the recess of the igniter-fixing portion.

8. A gas generator for a restraining apparatus according to claim 1, wherein
- each of the plurality of protruding portions of the cup-shaped container is formed by pushing inward the circumferential wall portion sandwiched between two cutting lines formed with a spacing in the axial direction and penetrating through the circumferential wall portion in the circumferential direction of the cup-shaped container, and
- at least the distal end portion of each of the plurality of protruding portions engages with the inner wall surface of the recess of the igniter-fixing portion.

9. The gas generator for a restraining apparatus according to claim 1, wherein
- the cup-shaped container and the tubular igniter-fixing portion are assembled such that an inner circumferential surface of the cup-shaped container and an outer circumferential surface of the igniter-fixing portion that is directly opposite the inner circumferential surface are in contact with each other.

10. The gas generator for a restraining apparatus according to claim 1, wherein
- the cup-shaped container and the tubular igniter-fixing portion are assembled such that an inner circumferential surface of the cup-shaped container and an outer circumferential surface of the igniter-fixing portion that is directly opposite the inner circumferential surface are spaced apart.

* * * * *